US008655786B2

(12) United States Patent  
Lakkapragada et al.

(10) Patent No.: US 8,655,786 B2  
(45) Date of Patent: Feb. 18, 2014

(54) AGGREGATE CONSTRAINTS FOR PAYMENT TRANSACTIONS

(75) Inventors: Raghu Lakkapragada, Bangalore (IN); Jeyandran Venugopal, Bangalore (IN); Jeffrey Gordon Lawson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1047 days.

(21) Appl. No.: 11/694,459

(22) Filed: Mar. 30, 2007

(65) Prior Publication Data

US 2008/0162365 A1 Jul. 3, 2008

Related U.S. Application Data (60) Provisional application No. 60/882,855, filed on Dec. 29, 2006.

(51) Int. Cl.
G06Q 20/00 (2012.01)

(52) U.S. Cl.
USPC .............................. 705/64; 705/76

(58) Field of Classification Search
USPC ....................................... 705/1–79
See application file for complete search history.

(56) References Cited

U.S. PATENT DOCUMENTS

| | | | |
|---|---|---|---|
| 7,496,527 B2 * | 2/2009 | Silverstein et al. | 705/26.8 |
| 7,513,418 B2 * | 4/2009 | Dragt et al. | 235/379 |
| 7,571,142 B1 * | 8/2009 | Flitcroft et al. | 705/44 |
| 7,979,347 B1 * | 7/2011 | Greener et al. | 705/39 |
| 8,015,084 B1 * | 9/2011 | Hirka et al. | 705/35 |
| 2002/0046169 A1 * | 4/2002 | Keresman et al. | 705/41 |
| 2002/0111886 A1 * | 8/2002 | Chenevich et al. | 705/30 |
| 2002/0120846 A1 | 8/2002 | Stewart et al. | |
| 2002/0138400 A1 | 9/2002 | Kitchen et al. | |
| 2002/0152179 A1 * | 10/2002 | Racov | 705/67 |
| 2002/0156745 A1 * | 10/2002 | Tallent et al. | 705/64 |
| 2003/0070080 A1 * | 4/2003 | Rosen | 713/187 |
| 2003/0158811 A1 * | 8/2003 | Sanders et al. | 705/39 |
| 2003/0208439 A1 * | 11/2003 | Rast | 705/38 |
| 2003/0211886 A1 * | 11/2003 | Buchanan et al. | 463/29 |
| 2003/0236728 A1 * | 12/2003 | Sunderji et al. | 705/35 |
| 2004/0039694 A1 * | 2/2004 | Dunn et al. | 705/39 |

(Continued)

FOREIGN PATENT DOCUMENTS

| WO | WO02065241 | 8/2002 |
|---|---|---|
| WO | WO03034310 | 4/2003 |
| WO | WO2006014668 | 2/2006 |
| WO | WO2006014721 | 2/2006 |

OTHER PUBLICATIONS

International Search Report dated Apr. 23, 2008 from corresponding PCT Application No. PCT/US07/87968, 2 pages.

(Continued)

Primary Examiner — Alexander Kalinowski  
Assistant Examiner — Murali Dega  
(74) Attorney, Agent, or Firm — Lee & Hayes, PLLC (57) ABSTRACT

This document describes tools capable of authorizing or enabling authorization of multiple payment transactions without requiring that a buyer or seller authorize each transaction separately. The tools may do so by enabling a buyer or seller to select aggregate constraints, such as a total price or number of transactions. Based on these selected constraints, the tools may authorize every payment transaction that meets the aggregate constraints without requiring the buyer to authorize every transaction separately.

20 Claims, 5 Drawing Sheets

(56) References Cited

U.S. PATENT DOCUMENTS

| | | |
|---|---|---|
| 2004/0073506 A1* | 4/2004 | Tull et al. ............... 705/36 |
| 2004/0128195 A1* | 7/2004 | Sorem ................... 705/14 |
| 2004/0185830 A1* | 9/2004 | Joao et al. ............. 455/410 |
| 2004/0210519 A1* | 10/2004 | Oppenlander et al. ..... 705/39 |
| 2005/0108153 A1* | 5/2005 | Thomas et al. .......... 705/39 |
| 2005/0125317 A1* | 6/2005 | Winkelman et al. ....... 705/30 |
| 2005/0170814 A1* | 8/2005 | Joao et al. ............. 455/411 |
| 2005/0263588 A1* | 12/2005 | Babi et al. ............. 235/380 |
| 2006/0026073 A1* | 2/2006 | Kenny et al. ........... 705/16 |
| 2006/0089906 A1* | 4/2006 | Rowley ................. 705/40 |
| 2006/0122943 A1* | 6/2006 | Mann et al. ............ 705/65 |
| 2006/0213979 A1* | 9/2006 | Geller et al. ........... 235/380 |
| 2006/0235796 A1* | 10/2006 | Johnson et al. ......... 705/44 |
| 2007/0017974 A1* | 1/2007 | Joao ................... 235/380 |
| 2007/0038560 A1* | 2/2007 | Ansley ................. 705/39 |
| 2007/0138257 A1* | 6/2007 | Dragt et al. ........... 235/379 |
| 2007/0150387 A1* | 6/2007 | Seubert et al. ......... 705/31 |
| 2007/0168260 A1* | 7/2007 | Cunescu et al. ......... 705/26 |
| 2007/0233594 A1* | 10/2007 | Nafeh .................. 705/37 |
| 2008/0167966 A1* | 7/2008 | Ramsdale et al. ........ 705/18 |

OTHER PUBLICATIONS

Extended European Search Report mailed Dec. 8, 2011 for European patent application No. 07865817.6, 8 pages.

* cited by examiner

AGGREGATE CONSTRAINTS FOR PAYMENT TRANSACTIONS

RELATED APPLICATION

This application claims the benefit of U.S. Provisional Application No. 60/882,855, filed on Dec. 29, 2006, which is hereby incorporated by reference.

BACKGROUND

Sellers offer and buyers purchase countless products and services over the Internet. To do so, buyers and sellers typically authorize a payment transaction for each purchase.

Assume, for example, that a buyer named "Bonnie" purchases three items from a seller named "Sam". Bonnie purchases a book from Sam on Monday, a DVD on Wednesday, and downloads a song on Friday. To pay for these items, Bonnie first sets up an account on Sam's website, enters her name, credit-card number, and address. On Monday she selects the book, is directed to a purchase screen where she checks on the price and other details, and then selects to purchase the book. On Wednesday she selects the DVD and, even if her account information is saved and readily available, she still has to check through the price and other details before she can select to purchase the DVD. On Friday she selects the song, checks that the price and other details are correct, and then selects to purchase the music. Bonnie separately authorized three different payment transactions.

Assume, also for example, that a buyer name "Billy" wants to purchase the right to play video games online from many different sellers of online gaming services. Each time he wants to play a game he may need to authorize a payment transaction. If he plays two games on Monday, one on Tuesday, and twelve games on Saturday, he may need to separately authorize fifteen payment authorizations. As this and the other example illustrates, requiring a buyer to separately authorize payment transactions for multiple items or services can be tedious and time consuming.

SUMMARY

This document describes tools capable of authorizing or enabling authorization of multiple payment transactions without requiring that a buyer or seller authorize each transaction separately. The tools may do so by enabling a buyer or seller to select aggregate constraints, such as a total price and number of transactions. Based on these selected constraints, the tools may authorize every payment transaction that meets the aggregate constraints without requiring the buyer to authorize every transaction separately.

This Summary introduces, in a simplified form, a subset of the concepts that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

An environment in which the tools may enable these and other actions is set forth below in a section entitled Exemplary Operating Environment. This section is followed by another section describing exemplary ways in which the tools may act to enable selection of aggregate constraints for multiple payment transactions and is entitled Aggregate Constraints. The next section is entitled Multiple Payment Transactions, and describes exemplary ways in which the tools enable authorization of multiple payment transactions without a separate payment authorization for each or an explicit authorization for any of the payments. A final section describes various other embodiments and manners in which the tools may act, and is entitled Other Embodiments of the Tools. This overview, including these section titles and summaries, is provided for the reader's convenience and is not intended to limit the scope of the claims or the entitled sections.

Exemplary Operating Environment

Before describing the tools in detail, the following discussion of an exemplary operating environment is provided to assist the reader in understanding some ways in which various inventive aspects of the tools may be employed. The environment described below constitutes but one example and is not intended to limit application of the tools to any one particular operating environment. Other environments may be used without departing from the spirit and scope of the claimed subject matter.

Figure 1:
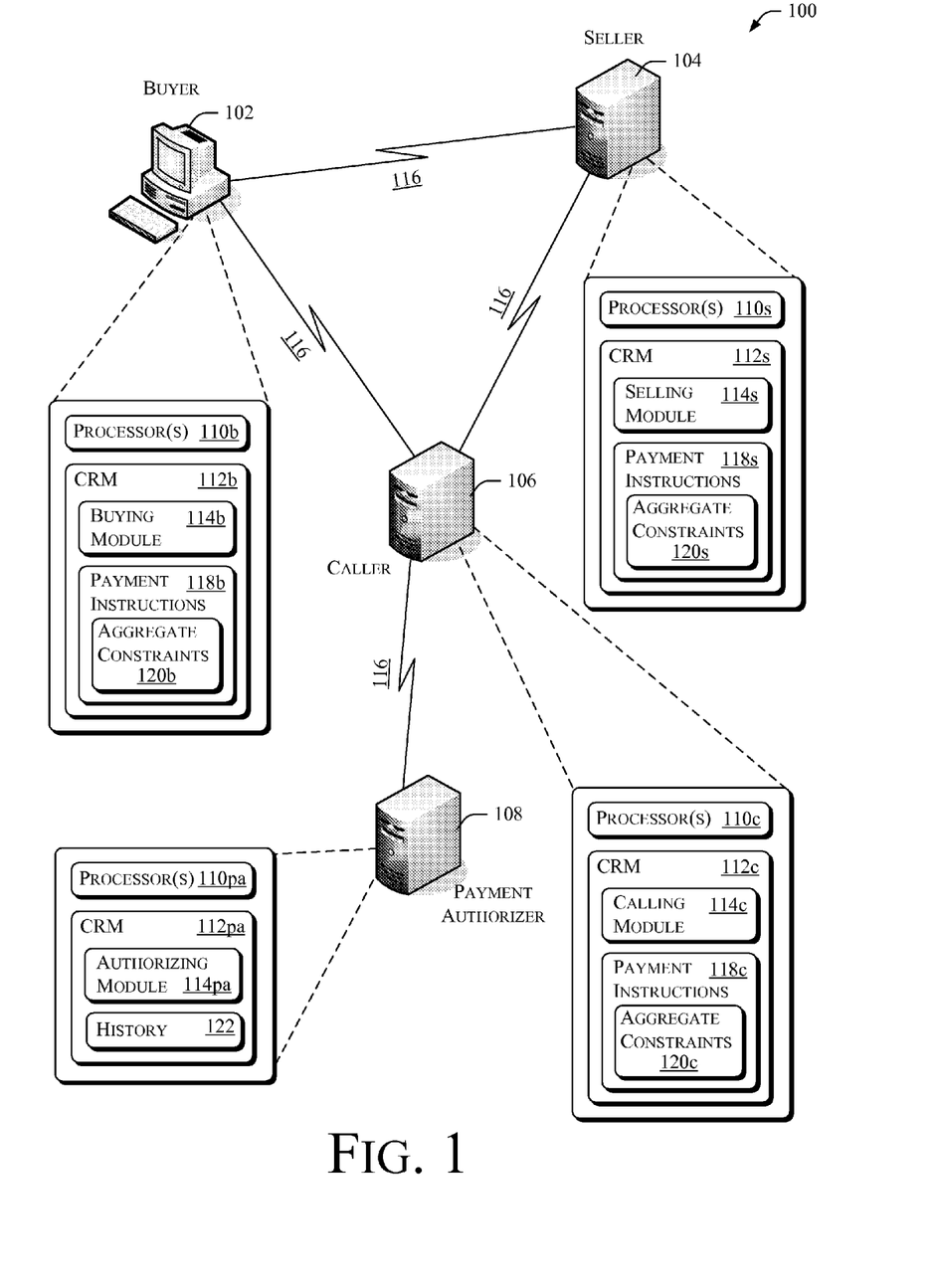
FIG. 1 illustrates an exemplary operating environment in which various embodiments of the tools may operate.

FIG. 1 illustrates one such operating environment generally at 100 having four parties to a payment transaction: a buyer 102; a seller 104; a caller 106; and a payment authorizer 108. Each of these parties is shown with a computing device—three with servers and one with a desktop—though each may comprise one or multiple computing devices of various types.

Each party may comprise one or more processor(s) 110b, 110s, 110c, and 110pa, respectively, which is capable of accessing and/or executing computer-readable media (CRM) 112b, 112s, 112c, and 112pa, also respectively. The buyer, seller, caller, and payment authorizer interact and manage their parts of a payment transaction with a buying module 114b, a selling module 114s, a calling module 114c, and an authorizing module 114pa, respectively. Each communicates with at least one of the others, such as through one or more communication networks 116 (e.g., a company intranet and/or or the Internet) or other communication path. If any of these parties share computing resources in a similar location, such communication may either be unnecessary or may be performed without a communication network.

Buying module 114b may include a network browser or other software capable of interacting with the seller and/or caller, either with a human buyer or a computing-entity buyer (e.g., a program interacting with the other parties through Application Program Interfaces (APIs)). The selling module similarly acts to provide online sales or services from a website intended for human use or through navigation to a program providing services to a computing-entity buyer.

Each of the buyer, seller, and caller has associated payment instructions 118b, 118s, and 118c, respectively. These payment instructions indicate what types or parameters of payments are approved by each, ways in which payment transactions are desired to be handled, and other information. The payment instructions reference contextual data (e.g., variables in payment transactions), parties to the transaction, and the parties' accounts as well as other information.

The buyer's instructions, for example, may be defined or specified such that only payments of less than $100 are authorized. The seller's instructions, for example, may stipulate that only payments greater than $1.00 be authorized. The caller's instructions may require that payments be made through particular banks or other financial entities. In some cases, payment instructions also include a party's preferences or information useful to other entities. A seller, for example, may indicate that it is willing to pay all fees for a payment transaction but preferably only if the buyer has not specifically agreed to do so. Or, also for example, a buyer's instructions may include information about the buyer that is useful to the seller but doesn't affect whether or not the payment transaction will be authorized (e.g., the buyer's purchasing trends or extra identifying information).

Any one of these sets of payment instructions may also include aggregate constraints 120b, 120s, and 120c, respectively. Aggregate constraints are those that may apply to multiple payment transactions. An aggregate constraint may limit a number of payment transactions or a defined number of transactions in a predefined period of time, such as three in one day or five to one seller. An aggregate constraint may also limit a dollar amount for a set of multiple payment transactions, such as a $100 maximum to a same seller or $1,000 maximum for one year regardless of the number of sellers. Thus, for example, where the maximum is set to $100, if two payment transactions were previously approved, one for $13.56 and the other for $65.44 for a subtotal of $79.00, the third may only be authorized if it is $21.00 or less. Aggregate constraints are described further in other sections.

In one implementation, the caller 106 includes the calling module 114c, which is capable of requesting authorization of a payment transaction, also referred to as making a payment "call." This request includes the payment instructions for itself, the buyer, and the seller. The buyer and seller sets up or selects an account, payment instructions, and/or aggregate constraints through the calling module or authorizing module.

The payment authorizer's authorizing module 114pa is capable of receiving a request for payment from the caller, determining if it should be authorized based on the payment instructions, and then authorizing and/or executing the payment transaction. The authorizing module may build and retain a history of prior payment transactions authorized or not authorized. This history may be used to determine if an aggregate constraint is met based on a currently requested payment transaction and prior, related payment transactions.

Aggregate Constraints

This section describes two examples where the tools enable selection of aggregate constraints for multiple payment transactions. These examples are implementations of the tools but are not intended to limit the scope of the tools or the claimed embodiments.

Figure 2:
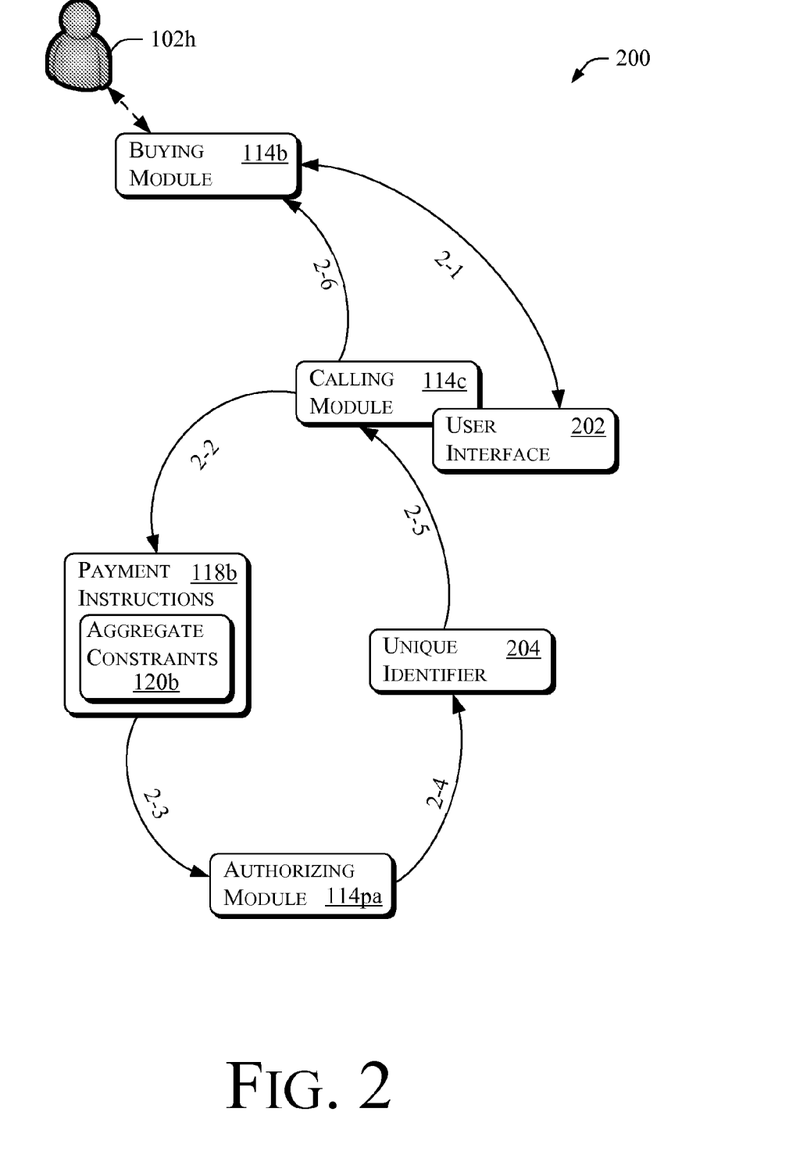
FIG. 2 illustrates an exemplary flow diagram in which the tools enable a human buyer to select aggregate constraints for multiple payment transactions.
Figure 3:
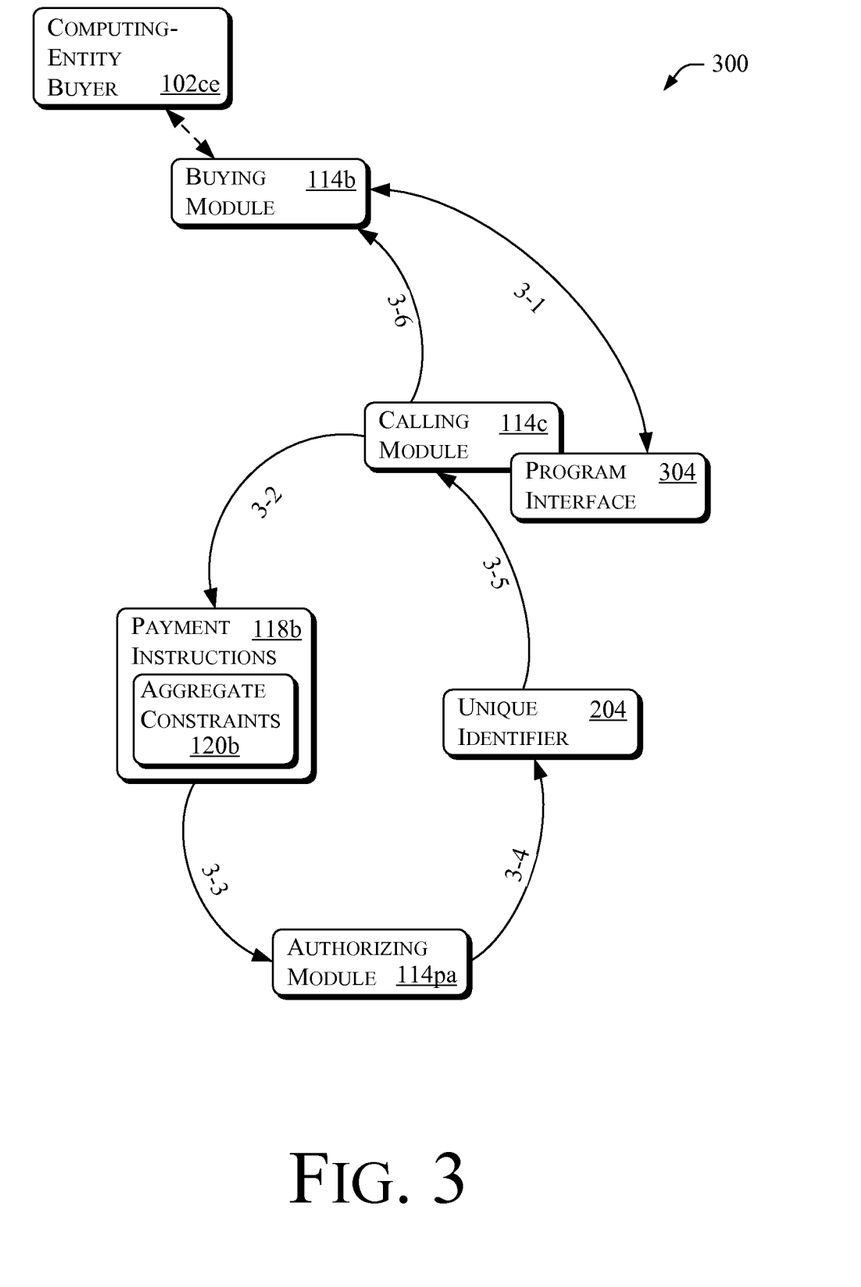
FIG. 3 illustrates an exemplary flow diagram in which the tools enable a computing-entity buyer to select aggregate constraints for multiple payment transactions.

These examples are illustrated in FIGS. 2 and 3, which show actions by and between calling module 114c, authorizing module 114pa, and two buyers. The first example is illustrated in FIG. 2 at flow diagram 200, which shows a human buyer 102h.

At arrow 2-1 in FIG. 2, calling module 114c enables buyer 102h to select a set of one or more aggregate constraints for aggregate multiple payment transactions. Here, the calling module includes or has access to a user interface 202 through which the user may select from these aggregate constraints. For example, the user interface may provide human-readable text indicating selectable aggregate constraints and receive a selected set of aggregate constraints through selection of the human-readable text or graphical indicia associated with the human-readable text. The calling module may also enable selection of a user account and other payment instructions. The calling module may enable these selections as part of a first purchase (e.g., the first time a buyer attempts to purchase a product or service from a website) or otherwise.

The calling module enables the buyer to select from the following aggregate constraints: a maximum number of payment transactions; a total monetary cost; a time period for the maximum number; a time period for the total monetary cost; a total maximum monetary cost regardless of any time period; and a total maximum number of payment transactions regardless of any time period. Assume that the buyer selects a maximum number of payment transactions at 5, the maximum monetary cost at $50, the time period for the maximum number of transactions at one week, the time period for the maximum monetary cost at one month, and a total maximum monetary cost regardless of any time period of $500. Responsive to this selection, the calling module builds, at arrow 2-2, the set of constraints 120b. These constraints are included with payment instructions 118b as shown in FIG. 2 at 120b. For a maximum number of payment transactions of 5 with a time period of one week, the constraint may be expressed as:

MyTokenUsageLimit1<=5;
MyTokenUsageLimit1Type='Count';
MyTokenUsageLimit1Duration=1 week;
MyTokenUsageLimit1Start='2005-05-01 12:00 PST';

For a maximum monetary cost of $50 with a time period of one month, the constraint may be expressed as:

MyTokenUsageLimit2<=50;
MyTokenUsageLimit2Type='Amount';
MyTokenUsageLimit2Duration=1 Month;
MyTokenUsageLimit2Start='2005-05-01 12:00 PST';

For a total maximum monetary cost regardless of any time period of $500, the constraint may be expressed as:

MyTokenUsageLimit3<=500;
MyTokenUsageLimit3Type='Amount';

Note that the calling module may enable the buyer to select all of these constraints at one time (i.e., as part of a discrete set of interactions). Also note that these constraints may be selected prior to a first requested payment transaction being requested or authorized, such as by enabling a buyer to go online, set up an account, decide on other, non-aggregate payment instructions, and decide on aggregate constraints prior to requesting any payment transactions. A human buyer may do this through the buying module (e.g., a network browser) and user interface 202 of the calling module 114c.

The set of multiple payment transactions to which the aggregate constraints applies may be governed by payment instructions as well as the aggregate constraints themselves. For example, if a particular buyer attempts to purchase a product, the aggregate constraints may or may not apply to a payment transaction for that purchase. If the payment transaction is not within either of the two selected time periods, then the aggregate constraints may not apply. If they do not apply, the payment transaction may not be authorized or may simply be handled without reference to the aggregate constraints (e.g., require a separate authorization). Or the payment instructions may indicate that the set of multiple payment transactions is only for some sellers, or a particular seller, or for a particular bank, and so forth. Thus, in some cases the aggregate constraints may indicate that requested payment transactions must follow the aggregate constraints but only within a time period and only for a particular seller.

In some other cases, however, aggregate constraints (e.g., an amount and number of payment transactions) are not bound to a particular time period. In these cases the aggregate constraints may indicate that requested payment transactions must follow the aggregate constraints without regard to a particular time period.

The buyer "Billy" from the Background Section, for example, may be enabled by the calling module to select a set of five online-gaming sellers and a time-period of one month. He may also select that the total monetary cost for payment transactions requested through those sellers and during a defined period be $100. But he may forgo setting a maximum number of transactions during that period. In so doing, he may choose to play a game online for $0.30, a hundred separate times within that month, and some other games from other sellers, so long as the total of the payment transactions add up to $100 or less within the one-month time-period. Here, he may play over a hundred separate games in a month without separately authorizing any of them. Billy simply begins playing the games whenever and however he likes so long as the cumulative cost of the games does not exceed his $100 limit per month.

At arrow 2-3 in FIG. 2, the calling module passes payment instructions 118*b* and aggregate constraints 120*b* to authorizing module 114*pa*. The authorizing module receives the payment instructions and aggregate constraints. The authorizing module then builds a unique identifier 204 for those aggregate constraints, shown at arrow 2-4. This unique identifier, also called a "token", may indicate aggregate constraints by including the aggregate constraints within the unique identifier. It may also or instead indicate a location to find the constraints or a manner in which to determine those constraints, such as in history 122 of FIG. 1.

In this embodiment the unique identifier is usable to determine the payment instructions and aggregate constraints, is cryptographically unique (e.g., encoded), and is a long string of alphanumeric characters. The authorizing module retains a copy of this unique identifier 204 and associates it with the payment instructions (including the aggregate constraints). It then passes the unique identifier to the calling module at arrow 2-5. The calling module then passes the unique identifier to the buyer module at arrow 2-6. The buying module may later use this unique identifier to purchase items without requiring the buyer to separately authorize payment transactions for each purchase.

Another example is illustrated in FIG. 3 at flow diagram 300, which shows a computing-entity buyer 102*ce*. In this embodiment, the tools enable computing-entity buyer 102*ce* to select aggregate constraints for multiple payment transactions. This example shows the entities and actions of the above example except as noted below.

Computing-entity buyer 102*ce* may include or interact with buying module 114*b* of FIG. 1 to select aggregate constraints. The buying module here does not include a network browser but instead contains application program interfaces (API) through which the buying module may enable the computing-entity buyer to select aggregate constraints made available through program interface 304. Thus, at arrow 3-1 the buying module uses APIs effective to cause the program interface to receive selected aggregate constraints. The other actions and interactions at arrows 3-2 to 3-6 may act is substantially the same manner as their counterparts in FIG. 2 but in the context of a computing-entity buyer.

This and other computing-entity buyers and sellers may desire to purchase or sell items without separately authorizing payment transactions for each. Examples of these include websites that desire to purchase items and services from other computing entities. A search website, for example, may wish to use a mapping service of another computing entity (e.g., a computing-entity seller) and pay for each use so long as such use is within certain aggregate constraints. Every time a user of the buyer's search website uses the mapping service through the buyer's website, the buyer may authorize a payment transaction for one cent, for example. If the buyer or seller selects aggregate constraints permitting a maximum number of payment transactions in a period, e.g., 100,000 per day, with a minimum and maximum cost of one cent, the buyer and/or seller may purchase or sell this mapping service without a separate authorization for each (or any authorization outside of selecting constraints and payment instructions).

In any case, whether the entity selecting aggregate constraints is a buyer or seller or human or computing entity, the tools permit selection of aggregate constraints. With these aggregate constraints—here indicated with unique identifier 204—the tools permit buyers and sellers (or even callers) to authorize payment transactions for items and services without separate authorizations for each. These examples continue in the following section in which the unique identifier is used by the authorization module to determine whether or not to authorize payment transactions.

Multiple Payment Transactions

This section continues the above examples in part and describes ways in which the tools determine whether or not to authorize payment transactions based on the aggregate constraints selected above and indicated in the unique identifier 204 of FIGS. 2 and 3. These examples are implementations of the tools but are not intended to limit the scope of the tools or the claimed embodiments.

Figure 4:
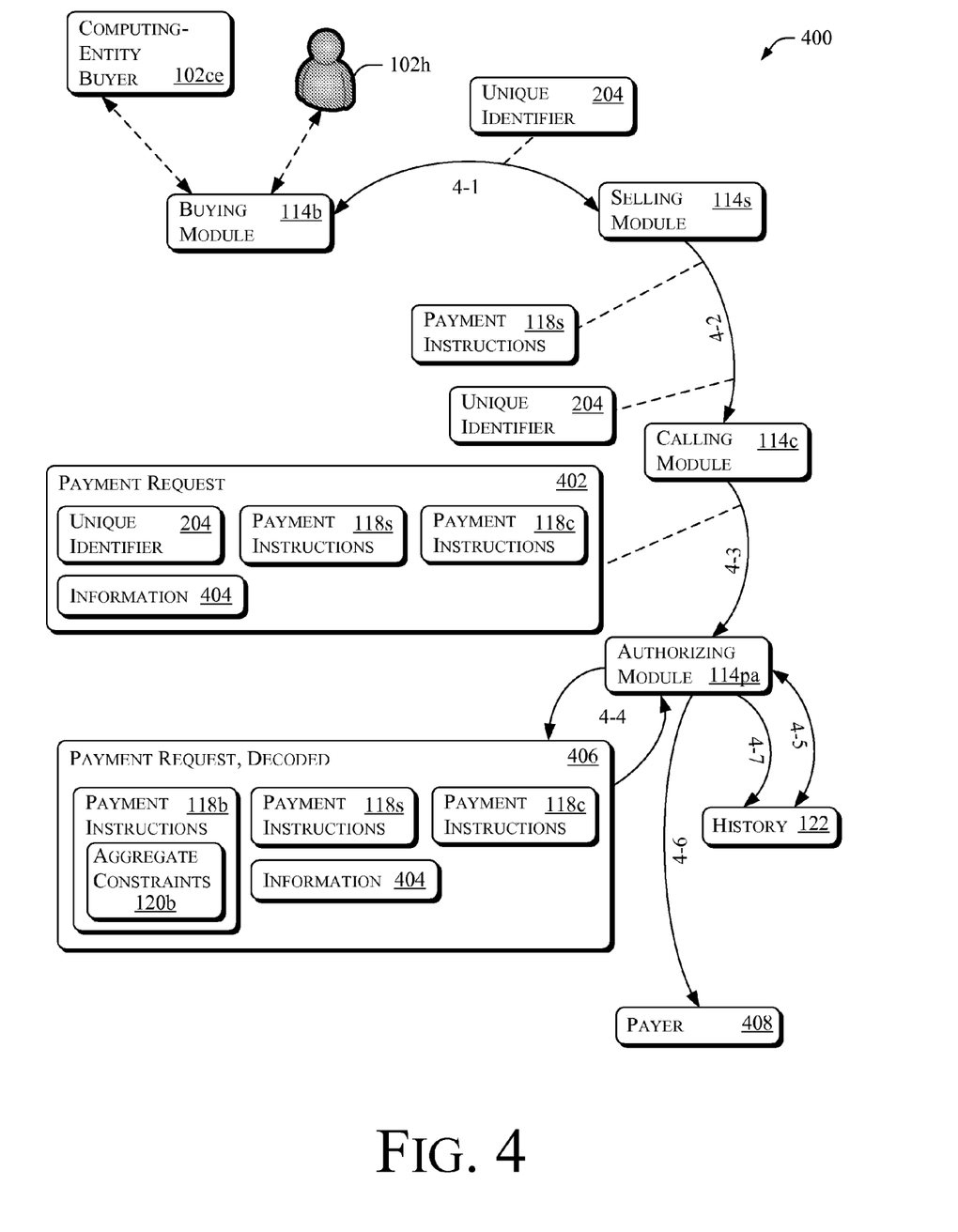
FIG. 4 illustrates an exemplary flow diagram in which the tools determine whether or not to authorize a payment transaction based on the aggregate constraints selected in FIG. 2 or FIG. 3.

At arrow 4-1 illustrated in FIG. 4 at 400, buyer 102 (e.g., 102*ce* or 102*h*) through buying module 114*b* interacts with selling module 114*s* to purchase an item or service. As part of this interaction the buying module may send, and the selling module may receive, the unique identifier 204 built in FIG. 2 or 3. Note that the buyer (whether human or not) may not have made any explicit authorization for a payment transaction. Instead, a human buyer desiring to play video games may just select to play the game. Or, also instead, a human buyer may simply select an item (e.g., a CD in the above example) with nothing more. Following this selection and without requiring an explicit authorization (or, in some cases, an additional interaction of any kind) from the buyer, a payment request is made. After the request is made, a payment transaction may be authorized, also without further interaction from the buyer. In the case of the above computing-entity buyer, the buyer may enable users to use the seller's mapping service automatically and without any explicit authorization by the buyer or its users.

At arrow 4-2 the selling module transmits the buyer's unique identifier and the seller's payment instructions 118*s* (including aggregate constraints 120*s*, if any), to the caller 106. The seller's payment instructions may be sent in total or the selling module may send a seller's unique identifier built similarly to that of the buyer's unique identifier (not shown). This seller's unique identifier is usable to determine the seller's payment instructions and aggregate constraints at a future part of the process.

The caller receives the buyer's unique identifier 204 and the seller's payment instructions 118s at arrow 4-2. In response, the caller's calling module combines the buyer's unique identifier, the seller's payment instructions, and the caller's payment instructions into a payment request, shown at arrow 4-3. This request is shown at 402 and includes this information as well as information specific to the purchase 404. This information here includes the buyer's identity (though this is also determinable with the buyer's unique identifier), the seller's identity (also determinable), the caller's identity (also determinable), the date of the attempted purchase (e.g., Dec. 13, 2005), and the cost (e.g., an online game to be played for $1.12).

Continuing one of the above examples, the payment request may include the following: 1) the caller's payment instructions 118c indicating the caller's identity and that the caller is not paying any fees for this payment transaction; 2) the seller's payment instructions 118s indicating the seller's identity, that the payment transaction can only be for receiving money (i.e., the seller is not sending money), that payments may be received only from credit cards and bank accounts, that the amount of payment must be at least $0.10, and that the seller agrees to pay the fee for this payment transaction; 3) the buyer's unique identifier 204, which is associated with the buyer's payment instructions and aggregate constraints; and 4) information 404 including the price of $1.12 and the date of Dec. 13, 2005.

The buyer's payment instructions indicate which sellers may receive payments (e.g., one of five online game sellers), that money may only be sent (not received), and the credit card number in the buyer's account. The buyer's aggregate constraints indicate that the maximum monetary cost is $100 in a period of one month beginning Dec. 1, 2005 and that there are no maximum number of payment transaction or any period for a number of payments.

At arrow 4-3 the authorizing module 114pa receives the payment request from the caller. At arrows 4-4 the authorizing module determines what are the payment instructions 118b and aggregate constraints 120b based on the unique identifier 204. The authorizing module retained the buyer's payment instructions including aggregate constraints in the history 122 as part of the actions illustrated in FIG. 2 or 3. With the prior association between the unique identifier and the payment instructions and aggregate constraints, the authorizing module decodes the unique identifier and determines the appropriate instructions and constraints. As noted above, these include the maximum monetary cost and the purchase date. The result of arrows 4-4 is a decoded payment request 406 including all payment instructions (and aggregate constraints) for the buyer, seller, and caller, and information 404.

At arrow 4-5 the authorizing module determines whether or not the aggregate constraints of the payment request are met. Here the buyer has aggregate constraints of $100 within a period of one month beginning Dec. 1, 2005. Thus, the authorizing module determines whether this particular payment request, when aggregated with all prior authorized payment requests within this period or associated with this unique identifier, are or are not met. To do so, the authorizing module refers to the history 122. The history 122 shows that this unique identifier has been used twice before and that two payments were authorized. These two were also for online games within the Dec. 1, 2005 to Dec. 31, 2005 time-period. The first was on Dec. 2, 2005 for $3.43 and the second was on Dec. 4, 2005 for $1.11. As the total for these two prior authorized payments is $4.54 and, combined with the requested payment of $1.12 is only $5.66, the aggregate cost for this and prior payments is well under the maximum of $100. Thus, the authorizing module determines that the aggregate constraints are met and the transaction proceeds.

Also as part of arrow 4-5, the authorizing module determines if the other, non-aggregate payment instructions are also met. For example, the authorizing module may determine if the seller is one of the five authorized sellers. If the authorizing module determines that all of the payment instructions for all three entities are met, the authorizing module authorizes or enables execution of the payment transaction at arrow 4-6. This authorization may indicate to some other entity to actually make the payment, here payer 408.

At arrow 4-7, the authorizing module records the authorization, payment instructions, and information in the history 122. The history now includes three payments authorized for the buyer's unique identifier. The authorizing module may use this history for the next requested payment having this unique identifier.

Note that the buyer, here Billy—who wanted to play an online video game—able to do so without an express or explicit authorization. Note also that Billy didn't separately authorize this payment or the other two recorded in the history.

Other Embodiments of the Tools

The above sections describe particular examples where specific entities of the exemplary embodiment, such as the buying, selling, calling, and authorizing modules act and interact to authorize payment transactions. In this section, other embodiments of the tools are described in which the tools are capable of authorizing or enabling authorization of multiple payment transactions without requiring that a buyer or seller authorize each transaction separately.

Figure 5:
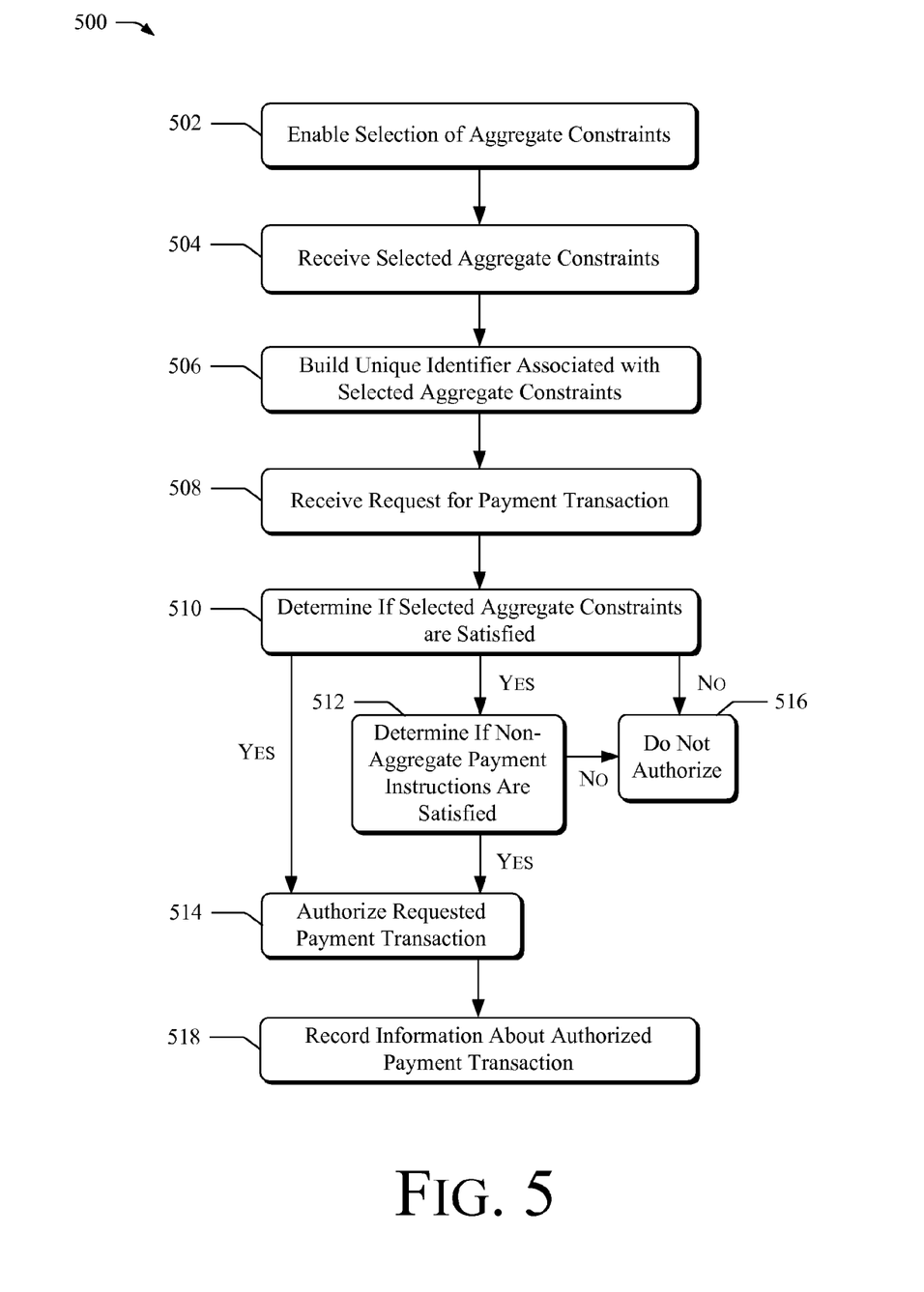
FIG. 5 is an exemplary process illustrating some ways in which the tools may act to authorize or enable authorization of multiple payment transactions without requiring that a buyer or seller authorize each transaction separately.

These other exemplary embodiments are described as part of process 500 of FIG. 5. This process and the flow diagrams described and illustrated in FIGS. 2 through 4 may be implemented in any suitable hardware, software, firmware, or combination thereof; in the case of software and firmware, this process and any of these flow diagrams represent sets of operations implemented as computer-executable instructions stored in computer-readable media and executable by one or more processors.

Block 502 of FIG. 5 enables a user to select a set of one or more aggregate constraints for aggregate multiple payment transactions. These aggregate constraints may include many factors or conditions that a buyer, seller, or caller may want to select for a set of aggregate payment transactions, such as a maximum total monetary cost of the multiple transactions, a maximum total number of multiple transactions, and time periods for each or both. Some of the above examples, for instance, provide for an aggregate price and an aggregate number of transactions.

Block 502 may enable a user to select these aggregate constraints prior to or incident with an attempt to purchase. Thus, a buyer may select constraints when he or she attempts to purchase a first of many items or services. Likewise, a seller or caller may do the same. Users may also select constraints prior to any purchases, such as a buyer setting up an account on the seller's website either with or without help from the caller.

Block 502 may also enable a user to select aggregate constraints for many transactions at one time. As described in the above examples, this enables a user (be it buyer, seller, or caller), to implicitly authorize many transactions without explicitly or separately authorizing any of them.

Block 502 may enable these actions for people or remote software applications, such as with a user interface for a human buyer or APIs for computing-entity buyers or sellers. Examples of these are set forth above.

Responsive to the act of enabling the user to select constraints, block 504 receives a selected set of one or more aggregate constraints. As noted in the examples above, this may be through a user interface or a program interface using APIs or other known manner. The calling module 114c of FIGS. 1-4 may enable, in some embodiments, both of blocks 502 and 504, either with direct communication with a user or through another entity. In the above examples the calling module interacts directly with a buyer, though it may also work in conjunction with a seller to interact with the buyer (e.g., by enabling a buyer to set up an account and select constraints through the seller's website).

Block 506 builds a unique identifier associated with the selected aggregate constraints. As noted above, this unique identifier may include or be usable to determine the selected aggregate constraints. In the above examples the unique identifier is an encoded alphanumeric string built and usable by the authorizing module to find the associated aggregate constraints. The unique identifier may be retained by the user for multiple uses, such as if the buyer retains its unique identifier and passes it to many different sellers for many different requests to purchase items or services.

Block 508 receives a request to execute a payment transaction constrained by the selected set of aggregate constraints. In some cases the tools determine if a particular requested payment transaction is associated with the selected set of aggregate constraints. The tools may do so based on an association between the payment transaction and the unique identifier, such by the payment transaction including the unique identifier as part of a payment call.

Block 510 determines whether the selected set of aggregate constraints are satisfied based on information associated with the payment transaction and, in many cases, a history of one or more prior payment transactions of the aggregate multiple payment transactions. This information may include a price, time, and identify of the parties to the transaction. The history may indicate time periods in which aggregate constraints apply, an aggregate price of payments previously authorized for payment, and a number of transactions previously authorized.

For example, if the information indicates that the price for the requested payment transaction is above a maximum monetary cost when aggregated (e.g., summed) with the aggregate monetary cost of previously authorized payment transactions that are associated with the same set of aggregate constraints, the tools will not authorize the payment. Similarly, if the history indicates that 100 payment transactions have previously been authorized or executed and which are associated with these aggregate constraints, the tools will not authorize a requested $101^{st}$ payment transaction if the maximum total number of payment transactions is 100. This assumes that there is no time period set or that they are all within a set time period.

If block 510 determines that the aggregate constraints are satisfied, the tools may proceed to block 512 or 514 along either "Yes" path. If they are not satisfied, block 510 proceeds along the "No" path to block 516.

The tools may—but are not required—to authorize execution of or execute the requested payment transaction if the aggregate constraints are met. If the tools proceed to block 512, they first determine whether other, non-aggregate payment instructions are met. Block 512 may do so by receiving an indication that other non-aggregate payment instructions (e.g., payment instructions 118 excluding aggregate constraints 120) are or are not satisfied. Block 512 may also do so by itself analyzing the non-aggregate payment instructions to determine if they are met.

Assume, for example, that block 510 determined that the requested payment transaction meets the selected aggregate constraints. Assume also that block 512 determines that the selected payment transaction is for $0.70 and that the non-aggregate payment instructions indicate that the minimum payment transaction is $1.00. In this case block 512 will not authorize the payment transaction even though the aggregate constraints are met. Other examples of how the tools may determine to authorize requested payment transactions are set forth above.

If block 512 determines that the non-aggregate payment instructions are also satisfied, it proceeds along a "Yes" path to block 514. Otherwise it proceeds along a "No" path to block 516. Block 516 refrains from authorizing or executing the requested payment transaction.

Block 514 authorizes or executes the requested payment transaction in response to block 510 or 512. Once authorized, the tools proceed to block 518. Block 518 records information about the authorized payment transaction, such as its price, time period, and identity of the parties to the transaction. This record (e.g., history 122 of FIG. 1) is usable for successive iterations of process 500 or its parts (e.g., blocks 508-514) by which the tools may determine if aggregate constraints of future requested payment transactions are met.

By way of review, consider the online-gaming example given above in the context of process 500. In this example the history 122 showed that a unique identifier had been used twice before and that two payments were authorized. These two were for online games within the Dec. 1, 2005 to Dec. 31, 2005 time-period. The first was on Dec. 2, 2005 for $3.43 and the second was on Dec. 4, 2005 for $1.11. The total for these two prior authorized payments is $4.54. Assume that the tools authorized a requested payment transaction for $1.12 because when summed with the prior-authorized payment transactions the sum is only $5.66, which is well under the maximum of $100. The tools, having now authorized a payment transaction for $1.12, record information associated with this payment transaction into history 122. Thus, the history may now indicate that three transactions have been authorized for three different sellers and that the total amount authorized is $5.66. If another request is received at block 508 that also is associated with the same set of aggregate constraints, it may be authorized if the requested amount is less or equal to $94.34 ($100.00−5.66=$94.34).

Conclusion

The above-described tools are capable of authorizing or enabling authorization of multiple payment transactions without requiring that a buyer or seller authorize each transaction separately. By so doing, the tools enable parties to payment transactions to forgo authorizing each payment transaction. A buyer, for example, may forgo tens, hundreds, or even millions of separate payment authorizations by selecting aggregate constraints for those payment transactions. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. A computer-implemented method comprising:
   receiving, by one or more computer systems, a request to authorize or execute a payment transaction associated with a unique identifier, the unique identifier encoded with constraints that include a maximum total monetary cost of transactions for a time period and a maximum total number of transactions for a different time period;
   determining, by the one or more computer systems, the maximum total monetary cost of transactions and the maximum total number of transactions based at least in part on the unique identifier;
   determining, by the one or more computer systems, an aggregated price based at least in part on:
      a price for the payment transaction, and
      a total price of one or more payment transactions that are associated with the unique identifier and that are previously authorized or executed within the time period;
   determining, by the one or more computer systems, an aggregated quantity based at least in part on:
      a quantity for the payment transaction, and
      one or more quantities of one or more payment transactions that are associated with the unique identifier and that are previously authorized or executed within the different time period; and
   authorizing execution of the payment transaction without explicit authorization from a party to the request if the aggregated price is less than or equal to the maximum total monetary cost of transactions and the aggregated quantity is less than or equal to the maximum total number of transactions.

2. The computer-implemented method of claim 1, wherein the unique identifier is a token having an alphanumeric character string encoded with the constraints, and determining the maximum total monetary cost of transactions and the maximum total number of transactions comprises decoding the alphanumeric character string.

3. The computer-implemented method of claim 1, wherein the unique identifier is a token having an alphanumeric character string comprising the constraints.

4. The computer-implemented method of claim 1, wherein the request comprises the unique identifier.

5. The computer-implemented method of claim 1, further comprising determining that the one or more previously authorized or executed payment transactions of the time period or the different time period are associated with the unique identifier.

6. The computer-implemented method of claim 5, wherein determining that the one or more previously authorized or executed payment transactions are associated with the unique identifier determines that each of the one or more previously authorized or executed payment transactions were received in a previous request containing the unique identifier.

7. One or more non-transitory computer-readable media having computer-readable instructions therein that, when executed by a computing device, cause the computing device to perform acts comprising:
   receiving a request to authorize or execute a payment transaction associated with a unique identifier, the unique identifier encoded with a set of aggregate constraints, the set of aggregate constraints comprising:
      a maximum total monetary cost of transactions for a time period, and
      a maximum total number of transactions for another time period;
   determining the set of aggregate constraints based at least in part on the unique identifier;
   determining whether the set of aggregate constraints are satisfied based on information associated with the payment transaction and a history of one or more prior payment transactions that were authorized based on satisfying the set of aggregate constraints, the determining (1) aggregating a price for the payment transaction and one or more prices for one or more prior payment transactions executed within the time period, and (2) aggregating a quantity for the payment transaction and one or more quantities for one or more prior payment transactions executed within the other time period; and
   providing the determination of whether the payment transaction satisfies the set of aggregate constraints effective to cause authorization of or execution of the payment transaction.

8. The one or more non-transitory computer-readable media of claim 7, wherein the acts further comprise determining that the payment transaction is constrained by the set of aggregate constraints based on an association between the payment transaction and the unique identifier associated with the set of aggregate constraints.

9. The one or more non-transitory computer-readable media of claim 8, wherein the association between the payment transaction and the unique identifier is determined based on the request to authorize or execute the payment transaction including the unique identifier.

10. The one or more non-transitory computer-readable media of claim 7, wherein determining whether the set of aggregate constraints are satisfied determines that the set of aggregate constraints are not satisfied if (1) the aggregate of the price of the payment transaction and the one or more prices of the one or more prior payment transactions executed within the time period is greater than the maximum total monetary cost of transactions, or (2) the aggregate of the quantity of the payment transaction and the one or more quantities of the one or more prior payment transactions executed within the other time period is greater than the maximum total number of transactions.

11. The one or more non-transitory computer-readable media of claim 7, wherein the time period is different than the other time period.

12. The one or more non-transitory computer-readable media of claim 7, wherein the time period is the same as the other time period.

13. The one or more non-transitory computer-readable media of claim 7, wherein the acts further comprise, before receiving the request to authorize or execute the payment transaction, generating the unique identifier to include the set of aggregate constraints.

14. A system comprising:
   one or more processors; and
   memory communicatively coupled to the one or more processors and storing computer-executable instructions that, when executed, cause the one or more processors to perform acts comprising:
      receiving a request to authorize or execute a payment transaction associated with a unique identifier, the unique identifier encoded with a set of aggregate constraints, the set of aggregate constraints comprising:
         a maximum total monetary cost of transactions for a time period, and
         a maximum total number of transactions for another time period;
      determining the set of aggregate constraints based at least in part on the unique identifier;
      determining whether the set of aggregate constraints are satisfied based on information associated with the payment transaction and a history of one or more prior payment transactions that were authorized based on satisfying the set of aggregate constraints, the determining (1) aggregating a price for the payment transaction and one or more prices for one or more prior payment transactions executed within the time period, and (2) aggregating a quantity for the payment transaction and one or more quantities for one or more prior payment transactions executed within the other time period; and providing the determination of whether the payment transaction satisfies the set of aggregate constraints effective to cause authorization of or execution of the payment transaction.

15. The system of claim 14, wherein the acts further comprise determining that the payment transaction is constrained by the set of aggregate constraints based on an association between the payment transaction and the unique identifier associated with the set of aggregate constraints.

16. The system of claim 15, wherein the association between the payment transaction and the unique identifier is determined based on the request to authorize or execute the payment transaction including the unique identifier.

17. The system of claim 14, wherein determining whether the set of aggregate constraints are satisfied determines that the set of aggregate constraints are not satisfied if (1) the aggregate of the price of the payment transaction and the one or more prices of the one or more prior payment transactions executed within the time period is greater than the maximum total monetary cost of transactions, or (2) the aggregate of the quantity of the payment transaction and the one or more quantities of the one or more prior payment transactions executed within the other time period is greater than the maximum total number of transactions.

18. The system of claim 14, wherein the time period is different than the other time period.

19. The system of claim 14, wherein the time period is the same as the other time period.

20. The system of claim 14, wherein the acts further comprise, before receiving the request to authorize or execute the payment transaction, generating the unique identifier to include the set of aggregate constraints.

* * * * *